United States Patent [19]

Kohler

[11] 3,995,347
[45] Dec. 7, 1976

[54] WINDSHIELD WIPER BLADE ASSEMBLY

[75] Inventor: Alfred Kohler, Bietigheim-Bissingen, Germany

[73] Assignee: SWF-Spezialfabrik fur Autozubehor Gustav Rau GmbH, Germany

[22] Filed: July 8, 1975

[21] Appl. No.: 594,062

[30] Foreign Application Priority Data

July 26, 1974 Germany ............................ 2436046

[52] U.S. Cl. .......................................... 15/250.42
[51] Int. Cl.$^2$ ....................................... B60S 1/04
[58] Field of Search .................. 15/250.36–250.42

[56] References Cited
UNITED STATES PATENTS

| | | | |
|---|---|---|---|
| 3,104,412 | 9/1963 | Hinder | 15/250.42 |
| 3,881,213 | 5/1975 | Tilli | 15/250.42 |
| 3,881,214 | 5/1975 | Palu | 15/250.42 |

*Primary Examiner*—Peter Feldman
*Attorney, Agent, or Firm*—McGlew and Tuttle

[57] ABSTRACT

A windshield wiper blade assembly comprises a blade yoke made of an elastic plastic material which has a surface on one side facing the windshield which is spaced apart from a wiper blade holding portion. A wiper blade of the usual rubber material includes a base portion which is positioned between the holding portion and the surface of the yoke and it also includes a wiper blade portion which extends in a direction outwardly from the base portion toward the windshield and through a blade passage defined in the holding portion. A flat spring member made of metal is disposed between the base portion of the blade and the yoke surface.

5 Claims, 7 Drawing Figures

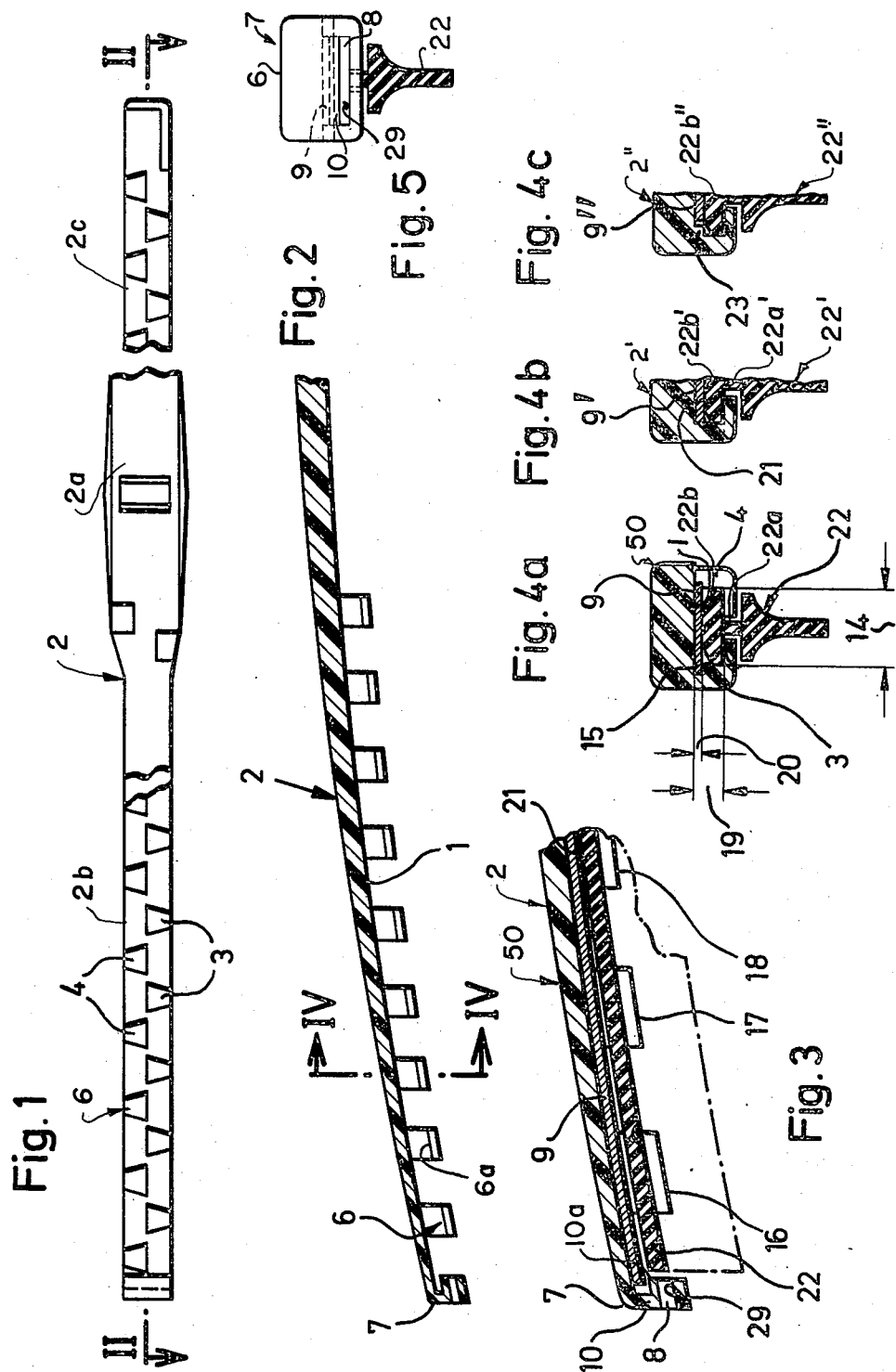

WINDSHIELD WIPER BLADE ASSEMBLY

FIELD AND BACKGROUND OF THE INVENTION

This invention relates in general to the construction of wiper blades and, in particular, to a new and useful wiper blade assembly for vehicle windshields which includes a supporting yoke for the blade which is resiliently stiffened by a flat metal spring disposed between the blade and the yoke.

DESCRIPTION OF THE PRIOR ART

The invention is particularly concerned with a construction of a wiper blade for wiper installations of vehicles for cleaning the windshields of such vehicles. The presently employed wiper blades usually consist of a wiper blade of rubber material which is resiliently stiffened by two spring bars held between a main yoke and two clawed yokes fastened to it, and the assembly is secured to a wiper arm. A disadvantage of this construction is that the plurality of individual parts requires manual interconnection and mounting and this results in an undue expense in the construction of such blade assemblies.

A known wiper blade construction as shown in U.S. Pat. No. 2,089,179 includes a main yoke and claw-yokes and the usual spring bar is replaced by one elastic, slightly bent plastic yoke in order to make the construction less expensive. The main disadvantage of a wiper blade of this type is that a modulus of elasticity of the plastic material varies considerably because of relatively minor changes in temperature. For this reason, the wiper rubber is pressed to the windshield with variable contact pressure and, consequently, the wiping results are very poor. Therefore, in spite of the favorable manufacturing costs, such a wiper system was only used in special cases.

SUMMARY OF THE INVENTION

The present invention provides an inexpensive wiper blade which may be produced with an inexpensive yoke of plastic material which will provide satisfactory wiping results. With the inventive arrangement, a spring bar is secured between a base portion of a rubber wiper blade and a surface of the yoke which faces toward the windshield. The construction advantageously includes blade support means formed integrally on the yoke, for example, by alternately offset, inwardly turned hook elements which depend from the surface of the blade facing the windshield and which define supporting surfaces for a base portion of the rubber wiper blade at a spaced location from the surface. The blade support defines a passage for the wiper blade portion of the rubber wiper blade which extends outwardly from the base portion toward the windshield. The construction advantageously includes a slot adjacent one end of the yoke to permit insertion of the base portion of the blade and the flat spring member or spring bar.

Accordingly, it is an object of the invention to provide an improved wiper blade construction which includes a blade yoke made of a plastic material which has a surface on one side facing toward the windshield and with blade support means which includes a holding portion for the wiper blades spaced from the surface which has a passage for the blade therethrough and further including a wiper blade made of the usual rubber material having a base portion disposed between the surface and the holding portion and also a wiper blade portion which is connected to the base portion and which extends through the blade passage toward the windshield, and further including a flat spring member which is disposed between the base portion and the yoke surface.

A further object of the invention is to provide a wiper blade construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the Drawing:

FIG. 1 is a partial bottom plan view of a wiper blade yoke constructed in accordance with the invention;

FIG. 2 is a section taken along the line II—II of FIG. 1;

FIG. 3 is a view similar to FIG. 2 but on a slightly enlarged scale and showing the installation of the wiper blade and the spring bar with the yoke;

FIG. 4a is a section taken along the line IV—IV of FIG. 2;

FIGS. 4b and 4c are sectional views similar to FIG. 4a of other embodiments of the invention; and FIG. 5 is an end elevational view.

DESCRIPTION OF THE PREFERRED EMBODIMENTS

Referring to the drawing in particular, the invention embodied therein, comprises a wiper blade assembly, generally designated 50, which, in the embodiment of FIGS. 1 through 4a, comprises a yoke or yoke member, generally designated 2, which comprises an elongated curved or bent member which is concavely arched toward the windshield with which it is to be employed. The yoke includes a central portion 2a which is adapted to be secured to a wiper blade arm and end portions 2b and 2c on respective sides thereof having blade support means, generally designated 6, formed as an integral portion of the yoke member which include a holding portion 6a which is spaced away from an undersurface 1 of the yoke 2 which faces toward the windshield. Holding portion 6a is provided with blade passage means to permit passage of a thin web portion 22a of a wiper blade, generally designated 22, which is made of the resilient material usually used, such as rubber. The support means 6 is formed by inturned hook-like holdings 3 and 4 which are defined on respective side edges of the yoke 2 and which are advantageously spaced apart sufficiently as more clearly shown in FIG. 4a to permit passage of the thin web 22a of wiper blade 22. The yoke middle section 2a is made wider than the end sections 2b and 2c and each end of the yoke is provided with a downturned flange part 7 formed by a vertical end part or end wall 10 having a slot opening 8 therethrough with a lower surface 29 which is at the same plane as the top surface 6a of the holding portion of the support means 6. The holding portion of the support means of the yoke 2 is constructed so that the spacing between the surface 1 and the surfaces 6a varies along the length of the yoke 2. In accordance with the invention, the wiper blade 22 includes a base portion 22b which is disposed between the surfaces 6a and the surface 1 and a spring plate or bar 9 which is made of a spring-like material, such as metal, is disposed between the base portion 22b and the undersurface 1. The spring 9 is advantageously accommodated in a groove formation 15 defined in yoke 2. The end wall 10 has an inturned flange which defines an inwardly extending shoulder 10a, and the end of the spring 9 overlies the shoulder for preventing the spring member from moving out of the yoke.

As seen in FIG. 3, the depth between the support surfaces 6a and the undersurface 1 adjacent the ends of the yoke 2 at locations of support hooks designated 16, 17 and 18 has a depth indicated by the dimension 19 in FIG. 4a. This depth is gradually reduced to the depth 20 which corresponds approximately to the thickness of the spring plate 9. With the wiper blade removed, the spring plate 9 is inserted through the opening 8. The blade is inserted between the holdings 3 and 4. The spring plate 9 is pressed against undersurface 1 by the arched inner surface 21 of base portion 22b of wiper blade 22.

In FIG. 4b, the embodiment therein, comprises a spring bar 9' having a width which corresponds to the width of the web portion 22b' of the wiper blade 22' which is shown as being measured at 14 at FIG. 4a. With such a construction, there is no groove 15 for the metal bar 9'.

In the embodiment of FIG. 4c, the spring bar 9'' is employed which is of a lesser width than the width of the base portion 22b'' of the blade 22''. In order to make sure that the spring bar is held in position, the yoke 2'' therefor advantageously includes a shoulder formation 23.

The invention provides a wiper blade assembly which comprises only three separate members since the yoke 2 with the support means 6 is advantageously formed of a single molded part. Advantageously, the yoke 2 is also formed with an integral end flange 7 which includes the web 10 with the inwardly turned bottom end which is made wider than the spring plate 9. The opening 8 provides means for inserting the base portion 22b of the wiper blade 22 and also the spring bar 9 when desired. The second part of the wiper blade assembly includes the blade itself with its base which is supported between the support means 6 and the underside 1 of the yoke 2, and the third part which is required comprises the spring bar or spring plate 9. The construction makes it possible to make the yoke 2 of a plastic material and any disadvantages of the construction being of plastic are avoided by utilizing the spring bar and without increasing the expenses of the construction. The spring bar may be varied in size and shape in accordance with the type of wiping operation which is required and in accordance with the curvature of the yoke 2 and the windshield which is to be cleaned.

While specific embodiments of the invention have been shown and described in detail to illustrate the application of the principles of the invention, it will be understood that the invention may be embodied otherwise without departing from such principles.

What is claimed is:

1. A wiper blade assembly for vehicle windshields, comprising a blade yoke made of an elastic plastic material and having a surface on one side facing toward the windshield, blade support means carried by said yoke including a holding portion spaced from said yoke surface and having blade passage means therethrough, a wiper blade having a base portion disposed between said surface and said holding portion and having a wiper blade portion connected to said base portion and extending through said blade passage towards the windshield, said yoke having at least one substantially vertical end wall closing one end of the space between said holding portion and said yoke surface with an inturned flange at its lower end having an opening therethrough and defining an interior shoulder extending inwardly from said end wall, a flat metal spring member insertable through the opening in said end wall and disposed after insertion of said spring member and said blade between said base portion and said yoke surface, the adjacent end of the base portion of said blade being aligned with and closing the opening, and with said spring member overlying said shoulder for preventing said spring member from moving out of said yoke.

2. A wiper blade assembly for vehicle windshields, according to claim 1, wherein the opening in said flange portion is bounded by a wall having a lower surface aligned with the surface of said holding portion.

3. A wiper blade assembly for vehicle windshields, according to claim 1, wherein said holding portion comprises a plurality of hook members extending outwardly from said yoke in a direction toward the windshield and having inturned end portions forming surfaces thereon spaced from said yoke surface, and being located on each side of said yoke and spaced apart centrally to permit passage of said wiper blade portion therethrough.

4. A wiper blade assembly for vehicle windshields, according to claim 3, wherein said wiper blade portion includes a narrow web extending between said hook portions on respective opposite sides of said yoke and a widened flange portion on the exterior of said hook portions tapering toward the windshield.

5. A wiper blade assembly for vehicle windshields according to claim 1, wherein said yoke and said support means are made of a single molded plastic part, the opening of the end wall slot being at least as large as the cross-section of said spring plate.

* * * * *